United States Patent Office 2,978,333
Patented Apr. 4, 1961

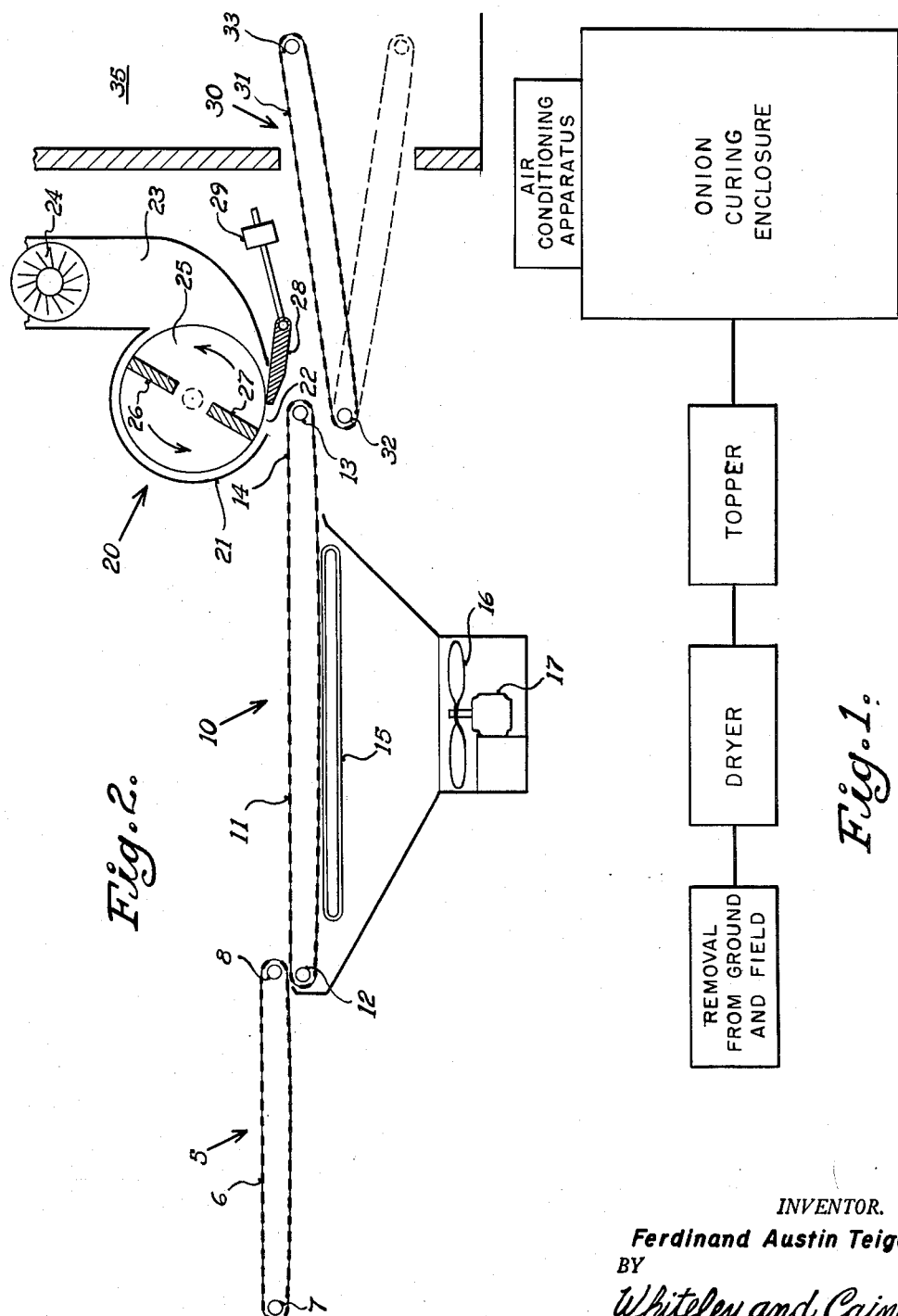

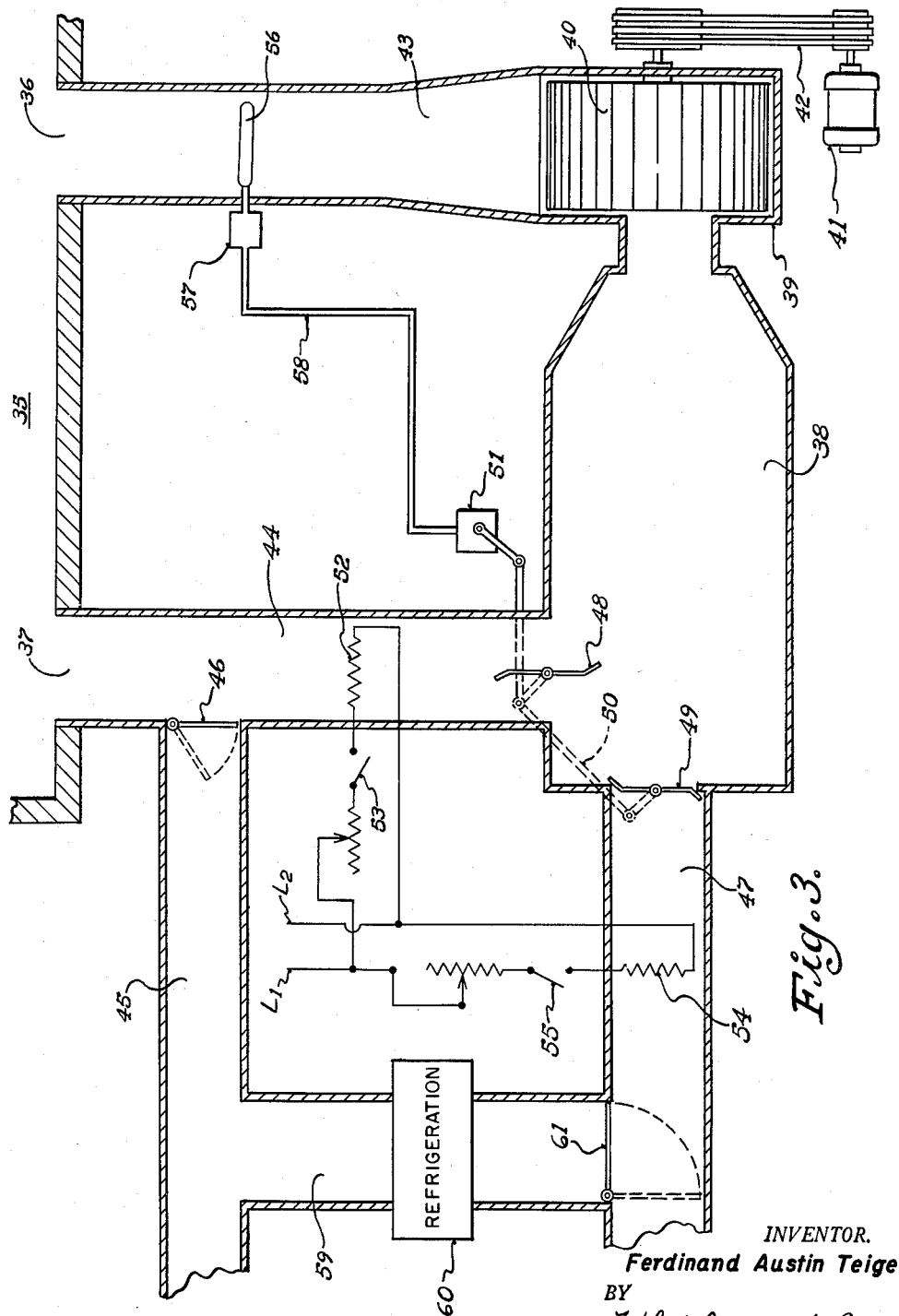

2,978,333
METHOD OF PREPARING ONIONS FOR SHIPMENT

Ferdinand Austin Teigen, Minneapolis, Minn., assignor to Allium, Inc., Minneapolis, Minn., a corporation of Minnesota Filed Oct. 13, 1958, Ser. No. 766,946

4 Claims. (Cl. 99—100)

This invention relates to a method of preparing bulb onions for shipment. In general, the invention is concerned with a method of processing bulb onions embodying various steps of treatment and cure thereof so as to enhance the value of the treated product which is shipped to market.

Bulb onions have been cultivated since prior to recorded history, and require a certain degree of treatment before they become a marketable product. The earliest method of treatment was to remove the entire onion plant from the ground and then braid the tops of several plants together so that groups of the entire plants could be suspended from suitable supports, such as the rafters of a building or enclosure. The braided product was so suspended for curing by atmospheric air. Such methods of treatment, particularly in areas surrounding the Mediterranean Sea where onions were originally grown, produced a desirable product, but the process required hand labor and could not economically be employed for the handling of large crops. As the culture of this vegetable extended to other parts of the world, the primitive methods of braiding and hanging the harvested product was abandoned in favor of excavating the bulbs from the soil and removing the tops thereof in the field, whence the topped bulbs were either windrowed on the ground or placed in bags or containers and left in the fields for exposure to wind and sun, in which state a form of curing occurred. Field curing of topped onion bulbs exposes bulbs to the vagaries of the weather and results in deterioration, and in many instances to substantial losses of the crop. In spite of the losses sustained, field curing of topped onion bulbs has prevailed as a major method of treating onions on the North American continent.

Recently, the prior methods have been improved to the extent that the onions which are topped in the field are taken to an enclosure where they are cured by treatment with conditioned air. These improvements are disclosed in my co-pending application Ser. No. 341,038, now Patent 2,855,839.

Despite the improvements involved in curing onions within an enclosure, the field topping and handling of the bulbs leaves much to be desired. By their very nature, onions are relatively delicate organisms, which are subject to injury through handling and particularly in removing the tops from the bulbs. When the top is severed from a bulb, an open wound is created, which exposes the succulent tissue and thereby creates a port of entry for spores and bacteria. The time required between the topping of the bulbs in the field and the transport thereof from the field to the storage enclosure is often sufficient to permit spores and bacteria to become established in the wounds and thereby permit infection with disease, such as "neck rot" before the bulbs are placed in the enclosure and treated with conditioned air.

In the present invention, I have provided a method of processing bulb onions that reduces the possibility of injury and deterioration, and which embodies a series of related steps for the proper treatment of the bulbs subsequent to their removal from the ground and until they are ready for shipment to the market. According to the present invention, the entire onion plants are removed from the soil with the tops intact with the bulbs. The onion plants may be removed from the ground in any manner, but it is contemplated that they would be removed by machinery and in a most economical manner. The complete onion plants are then assembled and transported to the receiving end of a system in which the onion plants are first superficially dried to prepare the tops for removal from the bulbs. Drying is generally required to assure the removal of any surface moisture. Thereafter, the tops are severed from the bulbs, and while any satisfactory method of severing the tops from the bulbs is acceptable, it is preferred that this step be accomplished by the use of a special form of machinery which functions to leave a compressed wound at the stem end of the residual bulb. Promptly after removal of the tops, the bulbs are subjected to treatment with conditioned air in an enclosure to heal the wounds created by topping or handling, and also cure the outer skins of the bulbs to establish a proper state of hygroscopicity to inhibit infection, and to eventually acquire a condition where the bulbs are in the best marketable condition. When the state of hygroscopicity of the outer skins of the bulbs reaches an optimum condition, such skins develop a characteristic condition, whereby when a body of onion bulbs are moved, a distinct rattle is developed and emitted. The tone of the rattle of the bulbs is a reliable indication of the physiological condition of the onions, and the failure of onions to rattle is indicative of a poor condition wherein the state of hygroscopicity of the skins is low, thereby indicating the need for the evaporation of considerable moisture. Persons skilled in the culture and marketing of onions readily recognize these conditions, and such conditions form the basis of tests during the curing of the onion bulbs.

An object of the invention is to provide a method of preparing onions for shipment, wherein the major steps of handling the bulbs occurs before the topping thereof, and the topped bulbs are substantially instantly subjected to curing treatment with conditioned air in an enclosure.

Another object is to provide a method of processing onion bulbs, which lends itself to the use of machinery to greatly reduce the cost of handling, topping and curing the bulbs.

Other and further objects of the invention may be apparent upon consideration of the following description and claims, and in the appended drawings in which:

Fig. 1 is a diagrammatic flow chart showing the several related steps involved in the processing of onion bulbs in preparation for shipment;

Fig. 2 is an illustrative diagram of apparatus for processing onion bulbs according to the present invention; and, Fig. 3 discloses a schematic representation of a form of apparatus for compounding and treating air which is conditioned and utilized for the curing of the onion bulbs.

Referring now to the several figures of the drawing, which are merely schematic, and intended for illustrative purposes only, the invention will be described in detail.

In the modern practice of cultivating commercial onions, it is customary and desirable to prepare relatively large tracts of land for this purpose, and the onions are grown from seed. When the plants are ready for harvest, any desirable method of removing the bulbs from the ground is used, and at the present time, suitable machinery is available for windrowing the bulbs, after which they may be appropriately elevated into trucks or other vehicles for transportation to a place of suitable storage or treatment. According to the present invention, it is essential that the tops be left intact with the bulbs during removal of the complete onion plants from the ground and during subsequent transportation to the place of treatment and handling until topped.

Referring now to Fig. 2 is schematically disclosed a form of apparatus for the handling, drying, topping and disposition of the onions. It should be understood that the actual apparatus is relatively complex and may form a part of an integrated establishment, except for the enclosure in which the onions are cured, and that such apparatus could, if desired, be of a portable nature so as to be moved from place to place in the general area in which onions are grown.

At the time of harvest, the onion tops exist in many different conditions. In many instances the tops are still green and relatively erect and firm. In other instances, the tops are wilted or partially wilted, and may be resting on the surface of the soil, or even partially buried in the soil. All of these diverse conditions can exist in the same field.

Onions may be removed from the ground in several different ways, such as by hand pulling, or by a combination scoop and conveyor, which liberates the plants from the earth, and also eliminates residual soil from the bulbs and may windrow the plants. Such machinery usually tops the bulbs and conveys them to a suitable vehicle after topping. Other methods may be used, including windrowing the plants with a large blade, preferably on the front end of a tractor. Any of these arrangements are suitable for the present process, except that according to the present process, the tops must remain intact with the bulbs.

General reference numeral 5 indicates a suitable form of receiver composed of an endless conveyor belt 6 that may be formed of slats or woven wire, and which is driven in a continuous manner over suitable journals 7 and 8, and which acts merely to form a bed or column of onions that are to be subsequently treated.

General reference character 10 indicates a drier composed of an endless conveyor belt 11 formed of slats or woven wire and driven over journals 12 and 13. Disposed beneath the conveyor belt 11 is a suitable source of heat indicated by a coil 15. Disposed beneath the coil 15 is an air moving means disclosed as a single fan 16 driven by a prime mover 17 to force air in relatively large volumes in heat exchange relationship with the source of heat 15, and thence through the perforate conveyor belt 11 and through and around the mass of onions being carried by the conveyor belt 11. It is the intent and purpose of the present invention to subject the onion bulbs traveling on the conveyor belt 11 to a current or blast of heated air for a sufficient time to skin dry the onion plants and also arrange the plants in an orderly manner on the conveyor for subsequent topping.

Because of the diverse nature and condition of the tops, it is desirable that they be dried enough to remove surface moisture, and that the plants be arranged in an orderly manner for topping, and these steps can be simultaneously accomplished with the drier 10 and associated parts. The blower 16 working in conjunction with the perforate conveyor, and possibly with air directing means, has an important function of orderly arranging the onion plants, and blower 16 should have the capacity to be able to lift or shift the position of each onion plant on the conveyor so that the top is projecting in a generally upward direction, or in any other orderly arrangement on the conveyor belt 11. It should be understood that a plurality of conveyor belts, and and a plurality of blowers and heaters may be used to accomplish the desired results.

As surface moisture and dirt is removed from the plants and tops, as a result of drying under the influence of air blasts, the top of each plant tends to act as a sail projecting away from the bulb in the direction of air flow, and therefore, in a generally erect position, in which position it passes to a space 14 on the conveyor 11 subsequent to the drying treatment.

Disposed at the rear end of the conveyor belt 11, and over the rear end of space 14 is a topping device, indicated by general reference numeral 20. The topping device 20 is composed of a scroll-shaped casing 21 that is formed with a lower opening 22, and an air discharge passage 23, which extends to a blower 24 capable of creating a negative pressure in the interior of casing 21 so as to draw air inwardly through the opening 22. Disposed within the casing 21 is a rotor 25, composed of a pair of laterally spaced circular plates, one of which is journaled at its axis to a motor or prime mover. Extending between the rotor plates are a pair of rotor blades 26 and 27 that are substantially rectangular in cross section, and which extend to the periphery of the rotor plates so that a leading edge of each blade forms a cutting surface that coacts with a stationary shear bar 28. The shear bar 28 is biased in the direction of the rotor plates by a weight 29, or its equivalent.

Disposed in rear of, and beneath the topper 20, is a conveyor 30 composed of a continuous belt 31 journaled on bearings 32 and 33. Said conveyor 30 is adapted for arcuate movement in a vertical direction as indicated in dotted lines, and it should preferably be adapted for arcuate movement in a horizontal plane for transferring the topped onion bulbs within the interior of an enclosure 35, wherein the superficially dried and topped bulbs undergo a curing treatment with conditioned air.

Referring now to Fig. 3 is disclosed a representative example of apparatus for conditioning air to cure onions within enclosure 35. The enclosure 35 is only fragmentarily disclosed, and would be constructed in accordance with climatic conditions that are likely to exist in the area where the onions are located, but it should preferably be substantially airtight. The enclosure 35 is provided with an air inlet duct 36 that would normally extend beneath a false floor, not shown, for suitably distributing air through the mass of onions stored within the enclosure. Enclosure 35 is also provided with an air outlet duct 37 that would preferably extend from adjacent the upper limits of the enclosure 35.

Situated exterior to the enclosure 35 is a form of apparatus for composing and conditioning air which consists of a mixing chamber or casing 38 that is suitably connected to a casing 39 that contains a blower 40 driven by a motor 41 with suitable driving means such as belt 42. Blower 40 is provided to draw air from casing 38 and passages connected thereto, and to discharge such air into a supply duct 43 that extends into the inlet opening 36 of enclosure 35. A return duct 44 extends from the outlet 37 of enclosure 35, and said duct is suitably connected to casing 38 at a part thereof spaced from the opening to the fan casing 39. Extending from duct 44 is an exhaust air duct 45, and at the junction of these ducts is a pressure actuated damper 46 that permits discharge of air from duct 44 when the pressure of air within said duct is in excess of atmospheric pressure. The duct 45 extends to outside atmosphere, and at least during part of the time serves to relieve superfluous air from the system to the atmosphere.

Also connected to casing 38 is a duct 47, which extends to a source of drier, cooler air, which may be fresh ambient air when the dew point and dry bulb temperature of said air is substantially lower than that of air in enclosure 35.

At the inner terminal ends of ducts 44 and 47 are dampers 48 and 49 that are interconnected by a linkage 50 to a motor 51, which is preferably of a modulating type. The dampers 48 and 49 are provided to control the flow of air from ducts 44 and 47 into the mixing chamber 38 within the limits and to the extent that some air is always being admitted from duct 44 when air is being admitted from duct 47, and vice versa, to provide by the resultant mixed air when discharged by blower 40 into supply duct 43, a mixed air from two different sources, which is forced from duct 43 into contact with and through the onions in enclosure 35.

Disposed within the duct 44 is a source of heat that is disclosed in the form of an electric resistance heater 52 that is actuated by a variable switch 53 operatively connected to a source of power indicated by references $L_1$ and $L_2$. The heater 52 has the capacity to impart to air passing through duct 44, 3-7 B.t.u.'s per pound of air. Disposed within duct 47 is a resistance heater 54 that is controlled by a variable switch 55. Heater 54 has the capacity of adding from 3-5 B.t.u.'s to the air passing through duct 47.

Disposed within the duct 43 is a temperature sensitive portion 56 of a thermostat 57. Thermostat 57 is connected to motor 51 by a cable 58. It should be understood that thermostat 57 is capable of controlling the operation of motor 51 in response to the temperature of air within duct 43, to move the dampers 48, 49, between their opposite extremities of movement.

It is essential that the air passing through duct 47 and across the heater 54 be of a dew point and dry bulb temperature that is substantially lower than the current dew point and dry bulb temperature of the air within enclosure 35. In the event that atmospheric air does not meet this requirement, there is disclosed a duct 59 that extends between the exhaust duct 45 and the inlet air duct 47. An air conditioning device 60 is disposed in the duct 59, and said air conditionioning device has the capacity of reducing the temperature of air flowing therethrough to any temperature desired of air in duct 47 prior to being heated by the heater 54. A damper 61 is disposed between ducts 59 and 47 to control the source of air flowing into the duct 47.

The operation of the invention will now be explained. The onion plants, with the tops intact, are removed from the ground in any suitable manner, and in that condition they are transported to the receiving station 5 where they are transferred, in a suitable manner, to the conveyor belt 6. The belt 6 travels in a clockwise direction, and disposes the onion bulbs with the tops intact in a more or less even layer onto the conveyor belt 11 of the drier 10. The drier 10 has a dual function of preparing the tops for removal by skin drying the onion plants and positioning the plants when they leave the drier so that the tops are in a generally vertical direction. The blower 16, therefore, must be able to shift the onions as well as remove superficial moisture. It is within the conception of the invention that several conveyors, and several blowers, may be necessary to do the required work, for it is recognized that the onion plants would ordinarily remain in the drier zone for several minutes, if necessary. As the onions reach zone 14, the tops are projecting generally upwardly from the bulbs. As the conveyed onion tops enter the air stream flowing into opening 22 of casing 21, they are lifted into the interior of said casing between the stationary shear bar 28 and one or the other of the rotating cutters 26, 27, and are severed by either of said cutters, passing over the shear bar 28. The action is one of compression, as well as severance, and this action tends to compress and seal the neck of the residual onion bulb. The positioning of the journal 13 of conveyor 11 with respect to opening 22 in casing 21 is relatively important. It is desirable that as soon as the onion top is pulled into the interior of casing 21 that gravity should act on the onion bulb to counteract the inertia of the horizontal movement of the bulb and prevent the bulb from being drawn into the interior of casing 21, or being abraded against the bottom of the shear bar 28, or other adjacent parts. The action of the cutters 26, 27, together with blower 24 causes removal and discharge of the severed tops, and the bulbs are picked up by conveyor 30 and moved into the curing space 35. Conveyor 30 is adapted for arcuate movement for properly distributing the bulbs in the enclosure.

After entry into the chamber 35, the freshly topped onion bulbs undergo a curing process, which finishes the product and places it in a marketable condition. By way of example, one method of curing the freshly topped bulbs is disclosed in Fig. 3. Assuming that the onions in enclosure 35 have a temperature of substantially 32° F., and that the ambient air has a dew point and dry bulb temperature of substantially 32° F. Under such conditions, the thermostat 57 is set at substantially 47° F., or a setting of substantially 15° higher than the temperature of the onion bulbs, and since there would be a substantial quantity of onions in enclosure 35, it is assumed that the temperature in said space would be relatively similar to the onion bulb temperature. Since the dry bulb temperature of ambient air is at least 12° F. lower than the setting of thermostat 57, ambient air may be used, the heaters 52 and 54 would be energized. Switch 53 is adjusted so that heater 52 will impart substantially 7 B.t.u.'s to the air in duct 44, and switch 55 is adjusted so that heater 54 will impart 3 B.t.u.'s per pound of air flowing through duct 47. With the parts in the position shown, and with fan 40 in operation, air is drawn from enclosure 35 through duct 44, where 7 B.t.u.'s per pound of air is imparted by heater 52 to raise the temperature of the air from 32° F. to substantially 60° F., thus raising the temperature of the air 13° F. above the setting of thermostat 57. Pursuant to this action, motor 51 is energized to move damper 48 towards a closed position, and damper 49 towards an open position and thus introduce into the mixing chamber 38 a substantial portion of ambient air having an initial temperature of 32° F., which has had added thereto 3 B.t.u.'s per pound of air to raise its temperature to substantially 44° F. Under these conditions, the thermostat 57 will cause motor 51 to proportionately adjust the positions of dampers 48 and 49 to produce a mixture of fresh and return air delivered to duct 43, having a temperature of 47° F. and a relative humidity in the range of substantially 30-70%, which air is then forced into the enclosure 35 and in contact with the onions therein. The process continues in this manner, and as the temperature of the onions is raised, the setting of thermostat 57 is correspondingly adjusted in an upward direction until the onions reach a body temperature of substantially 60° F., whence the thermostat 57 is adjusted to a temperature of substantially 62° F., and the heat input of heater 52 is reduced from substantially 7 B.t.u.'s to substantially 3 B.t.u.'s per pound of air passing through said duct, and the process is continued until the tone of the rattle of the onions in enclosure 35 is satisfactory, whereupon the operation is shut down, but would be intermittently operated, as described heretofore until the end of the primary cure, whence the temperature of the onions is gradually reduced to substantially 32° F.

Assuming next that the freshly topped onions in enclosure 35 are of a temperature of substantially 80° F., and the temperature of the ambient air is also 80° F. In this example, the refrigeration unit 60 is energized to produce air having a temperature of substantially 45° F. or less. Under these conditions, heater 52 is energized and its variable switch 53 is adjusted to produce an increase of 3 B.t.u.'s per pound of air, and heater 54 is energized with its switch 55 adjusted to produce 5 B.t.u.'s per pound of air through duct 47. The thermostat 57 is set at a temperature of substantially 15° lower than the temperature of the onions, or to a temperature of substantially 65° F. Then, with the parts in the position shown, air from enclosure 35 passing through duct 44 is heated to a temperature of substantially 92° F., and as this temperature is above the setting of thermostat 57, the motor 51 is energized to substantially shut off the flow of air from duct 44 and admit a maximum volume of air from duct 47, which air has been heated from a temperature of 45° F. to 65° F., whence such air is passed through the supply duct 43 into enclosure 35 to gradually reduce the temperature of the onions therein. As the temperature of the onions is reduced, the setting of thermostat 57 is correspondingly reduced in a downward direction until the temperature of the onions is substantially 68° F., whence the refrigeration apparatus 60 is adjusted to produce air of a temperature of substantially 40° F. or lower, and the setting of thermostat 57 is adjusted to substantially 62° F., and the process continued until the tone of the rattle of the onions is satisfactory.

It should be understood that whenever the refrigeration unit 60 is energized, the heater 54 is adjusted through its variable switch 55 to impart 5 B.t.u.'s per pound of air flowing through the duct 47.

The terminal cure process is substantially similar to that described heretofore, with respect to the primary curing process, except that it is desired to reduce the temperature of the onions to substantially 32° F. Normally, the temperature of the ambient air in the northern regions of the United States will be relatively low when the onions are ready for the terminal curing stage, and therefore, air of desired dry bulb temperature for curing the onions from the primary curing temperature range of substantially 50°–68° F. may be used, but in the event the ambient air is not at least 12° lower than the setting of thermostat 57, then the refrigeration apparatus 60 must be used to produce air which is passed through duct 43 to treat the onions in enclosure 35. Assuming that after primary cure, the onions in enclosure 35 have a temperature of substantially 60° F., then thermostat 57 is set at a temperature substantially 15° lower than the onion temperature, or at a setting of substantially 45° F. If the ambient air has a dew point at least 12° lower or 33° F. or less, it may be used; otherwise, refrigeration unit 60 must be energized. Assuming that ambient air may be used, heater 52 is energized and switch 53 is adjusted so that the heater imparts 3 B.t.u.'s per pound of air in duct 44, and heater 54 is energized and switch 55 adjusted to impart 3 B.t.u.'s per pound of air flowing through duct 47. Under these conditions, the onions will be gradually cooled, whereupon the setting of thermostat 57 is adjusted in a downward direction until the temperature of the onion bodies reaches substantially 32° F. When the onion temperature has been satisfactorily reduced, the operation of the unit is intermittently conducted whenever the tone of rattle of the onion bodies is less than a loud and clear sound, and the operation is thus continued until the onions are shipped.

The principal advantage of this invention is that it is capable of effecting substantial economies in the preparing of onions for shipment and greatly reduces the costs thereof below any figures heretofore obtainable.

Another advantage is that the process substantially reduces losses heretofore sustained through the deterioration of the product.

A further advantage is that this invention provides for processing onions in such a manner as to increase the quality of the product and, therefore, increase its market value.

I claim:

1. A method of preparing bulb onions for shipment, comprising the steps of: removing from the soil bulb onions with the tops intact; forcing into contact with and through said onions after removal from the field, air conditioned to have a vapor pressure substantially lower than that of said onions and a temperature sufficiently higher than that of said onions to only superficially dry said onions; severing the tops of said onions and compressing the necks of the residual bulbs by shearing stress while said onions are free from superfluous moisture; delivering the residual bulbs substantially immediately after topping to a substantially weather-proof enclosure; and forcing into contact with and through said bulbs, when the temperature of said bulbs is outside the degree fixed as the concurrently desired temperature thereof and/or when said bulbs carry superfluous moisture, air conditioned to have the capacity to adjust the temperature of said bulbs to said fixed degree and/or to dissipate superfluous moisture when carried by said bulbs, until said bulbs are shipped.

2. A method of preparing bulb onions for shipment, comprising the steps of: removing from the soil bulb onions with the tops intact; forcing into contact with and through said onions after removal from the field, air conditioned to have a vapor pressure substantially lower than that of said onions and a temperature sufficiently higher than that of said onions to only superficially dry said onions until free moisture carried by said onions is dissipated; shearing off the tops of said onions while free of superfluous moisture, and concurrently compressing the necks of the residual bulbs into cohesion; delivering the residual bulbs immediately after topping to a substantially weather-proof enclosure; and forcing into contact with and through said bulbs, when the temperature of said bulbs is outside of the degree fixed as the concurrent desired temperature thereof and/or when said bulbs carry superfluous moisture, air conditioned to have the capacity to adjust the temperature of said bulbs to said fixed degree and/or to dissipate superfluous moisture when carried by said bulbs, until said bulbs are shipped.

3. A method of preparing bulb onions for shipment, comprising the steps of: removing from the soil bulb onions with the tops intact; forcing into contact with and through said onions after removal from the field, air conditioned to have a vapor pressure substantially lower than that of said onions and a temperature sufficiently higher than that of said onions to only superficially dry said onions; severing the tops of said onions; delivering the residual bulbs substantially immediately after topping to a substantially weather-proof enclosure; and forcing into contact with and through said bulbs, when the temperature of said bulbs is outside of the degree fixed as the concurrently desired temperature thereof and/or when said bulbs carry superfluous moisture, air conditioned to have the capacity to adjust the temperature of said bulbs to said fixed degree and/or to dissipate superfluous moisture when carried by said bulbs, until said bulbs are shipped.

4. A method of preparing bulb onions for shipment, comprising the steps of: removing from the soil bulb onions with the tops intact; forming said onions into a single layer moving column; forcing into contact with and through said column of moving onions air conditioned to have a vapor pressure substantially lower than that of said onions and a temperature sufficiently higher than that of said onions to only superficially dry said onions in movement, severing the tops of said onions while the column is in movement; delivering the column of topped bulbs to a weather-proof enclosure; forcing into contact with and through said bulbs in the said enclosure when the temperature of said bulbs is outside the degree fixed as the concurrently desired temperature thereof and/or when said bulbs carry superfluous moisture, air conditioned to have the capacity to adjust the temperature of said bulbs to a temperature concurrently optimum for curing and until such bulbs are free of superfluous moisture; and repeating said forcing of air through said bulbs while in said enclosure when said bulbs are not free of superfluous moisture and/or have a temperature outside a degree concurrently optimum for the preservation of said bulbs until shipped.

References Cited in the file of this patent

UNITED STATES PATENTS

| | | |
|---|---|---|
| 1,671,263 | Zuckerman | May 29, 1928 |
| 2,553,519 | Lenz | May 15, 1951 |
| 2,855,839 | Teigen | Oct. 14, 1958 |

OTHER REFERENCES

"Encyclopedia of Food," by Ward, 1923, page 357.